United States Patent

[11] 3,592,023

| | | |
|---|---|---|
| [72] | Inventor | Hideo Okoshi<br>Fujisawa-shi, Japan |
| [21] | Appl. No. | 835,960 |
| [22] | Filed | June 24, 1969 |
| [45] | Patented | July 13, 1971 |
| [73] | Assignee | Nippon Seiko Kabushiki Kaisha<br>Tokyo, Japan |
| [32] | Priority | June 27, 1968 |
| [33] | | Japan |
| [31] | | 43/44188 |

[54] CONSTANT VELOCITY UNIVERSAL JOINT
1 Claim, 11 Drawing Figs.

| | | |
|---|---|---|
| [52] | U.S. Cl. | 64/21 |
| [51] | Int. Cl. | F16d 3/30 |
| [50] | Field of Search | 64/21 |

[56] References Cited
UNITED STATES PATENTS

| | | | |
|---|---|---|---|
| 3,475,924 | 11/1969 | Aucktor | 64/21 |

*Primary Examiner*—Mark M. Newman
*Assistant Examiner*—Randall Heald
*Attorney*—Marn & Jangarathis ABSTRACT: The present invention provides a constant velocity universal joint of the type in which an outer joint member is disposed coaxially of an inner joint member and the inner concave spherical surface of the outer joint member is formed coaxially with the outer convex spherical surface of the inner joint member, but no retainer is used which avoids the problem of lubrication. According to this invention, the balls for transmitting power are held in the grooves intersecting with each other and provided in said two members, respectively, and the balls lie in the plane bisecting the angle between the axes of the drive and driven shafts. One-half the working angle $\beta$ is selected to be less than the angle $\alpha$ of inclination so that the torque transmission is not abruptly reduced. The cross section of said groove is a simple arcuate curve, the machining of the grooves is much facilitated.

CONSTANT VELOCITY UNIVERSAL JOINT

The present invention relates to a homokinetic or constant velocity universal joint of the type employing balls as power-transmitting elements.

One of the conventional universal joints of the type described has such a construction that the grooves for receiving balls are formed both in the side surfaces of the drive and driven yokes, respectively, thereby retaining the balls in these grooves. Another conventional universal joint of the type described has such a construction that an outer joint member is disposed coaxially of an inner joint member and the inner spherical surface of the outer joint member is formed so as to be coaxial with the outer spherical surface of the inner joint member. Between the space defined by these two spherical surfaces are interposed retainers, and the grooves are formed in the spherical surfaces of the outer and inner joint members along their medians eccentrically of the axes thereof for receiving the balls in the grooves.

However, the defects of the former are that when a higher torque is transmitted between the drive and driven yokes and when the joint is used at high revolution rate, the yokes tend to deform, diverging radially; and that the yokes cannot receive the thrust load in the direction in which the yokes are spaced apart from each other so that the an auxiliary mechanism for positioning the directions of the axes of the drive and driven shafts is required.

The defects of the latter are such that the retainer thereof must be machined with high accuracy in order that the balls are laid in the constant velocity plane by means of the retainer; the strength of the retainer also presents a serious problem because the universal joint of this type can receive the thrust load exerting between the retainer and the joint members, but further thrust loads are exerted to the balls in case of torque transmission; the outer and inner surfaces of the retainer is easily susceptible to wear and abrasion so that even a slight wear in the radial direction causes a large gap in the axial direction, thereby adversely affecting the smooth operation of the joint; and the lubrication to the surfaces of the retainer is extremely difficult. Furthermore, at a working or transmission angle in excess of a limit angle, only two of six balls participate in torque transmission from the standpoint of the principle of the universal joint of this type so that the torque transmission is abruptly reduced. Moreover, a special machine must be provided for machining the grooves for receiving balls of the outer joint member. In this case, generally a grinder having a shank and having its extremity shaped in the form of semisphere having a very small radius must be used so that the spindle of the grinding machine must be rotated at high revolution rate and the life of the grinder is very short, thus presenting undesired problems in machining.

The primary object of the present invention is to eliminate completely all of the defects encountered in the application and fabrication of the conventional joints of the type described. In a constant velocity universal joint of the present invention, an outer and inner joint members are arranged and disposed as in the case of the latter joint so as to prevent the deformation of the joint at high torque and high revolution rate, but no retainer is utilized which brings about the problem of lubrication as described above.

The above primary object of the present invention can be accomplished by the special ball-retaining groove construction of the present invention which prevents the generation of the force acting in the axial direction on the ball, can retain steadily the balls even if the axes of the joint members are inclined at a large angle of inclination with each other and in the constant velocity plane (the bisecting plane which bisects an angle between the axes of both members).

Furthermore, no auxiliary mechanism for holding the directions of the axes of the members is required. The torque transmission will never be reduced abruptly even if the working or transmission angle between the axes of the members is increased. Even though the constant velocity universal joint of the present invention has various features and advantages which cannot be attained by the conventional joints of the type described, the joint of the invention can be made simple in construction, compact in size, light in weight and easy to manufacture with less cost.

The present invention will be described more in detail with respect to the illustrative embodiment shown in the accompanied drawings, in which.

Figure 1:
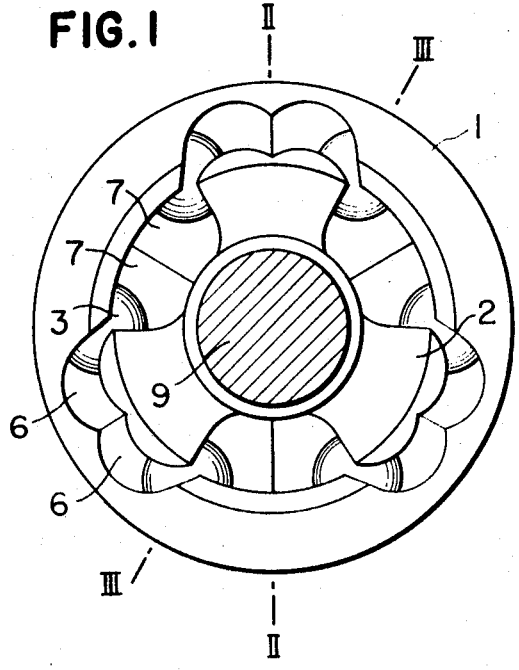
FIG. 1 shows a front view of one embodiment of the present invention having six balls used in transmitting the power, in which the axes of drive and driven shafts are aligned with each other.

The embodiment illustrated in the drawings has three pairs of grooves, i.e. six grooves and six balls used in transmission of the power. An outer joint member 1 has an inner spherical surface 4 and is coupled to a shaft 8. As shown in the drawings, the outer joint member 1 may be integrally coupled with the shaft 8 or fixed through a bolt or the like. An inner joint member 2 has an outer convex spherical surface 5 adapted to be fitted into the space defined by the outer joint member 1 in closely spaced-apart relation with the inner concave surface 4. The inner joint member 2 is coupled to another shaft 9 through serration, spline or the like formed in the inner surface. Reference numerals 19 and 20 designate stop rings for fixedly securing the inner joint member 2 to the shaft 9.

The inner and outer spherical surfaces 4 and 5 are provided with grooves. To facilitate understanding of the present invention, only one pair of grooves 6 and 7 are shown in FIG. 1, but in practice three pairs of grooves 6 and 7 are disposed so as to intersect each other. One ball is disposed in one pair of grooves. Two sets of alternately selected three balls transmit the power in the clockwise and counterclockwise directions, respectively.

Figure 7:
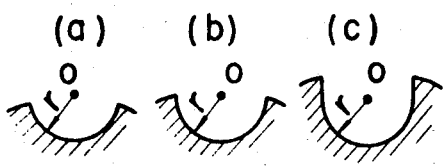
FIG. 7 is a sectional view illustrating the cross-sectional configuration of the groove.

The cross-sectional configurations of the grooves 6 and 7 taken along the plane substantially perpendicular to the direction of the grooves are shown in FIG. 7. The cross-sectional configuration is a semicircle having a radius $r$ slightly larger than that of the ball 3. The cross-sectional configurations are however varied depending upon the position at which cross-sectional views are taken, as shown in ($a$), ($b$) and ($c$) of FIG. 7, from a circular configuration to the configuration substantially similar to U-shape. The reason for this is that the center of the circular locus is not in coincidence with the center of the spherical surface as will be discussed in more detail hereinafter.

Referring back to FIG. 4, the loci of the centers of the radii of the grooves 6 and 7, which are shown by the broken lines and solid lines respectively, are the circles 10 and 11 each having the radius $R$ which is substantially equal to the radius of the spherical intersurface between the inner and outer surfaces 4 and 5 (The center of the radius of the groove is "0" in FIG. 7). The circular locus 10 of the center of the radius of the groove 6 is traced in the plane 14 which intersects at the center 12 common in both of the joint members with the axis 13 of the outer joint member 1 at an angle of $\alpha$. The center 15 of this circular locus 10 is at the intersection of a plane (the surface of the paper of FIG. 4), containing the axis 13 and intersecting at a right angle with the plane 14, and is spaced apart from the center of the spherical surface by a distance of $S$. On the other hand, the circular locus 11 of the center of the radius of the groove 7 is traced upon a plane 17 which intersects at the center 12 of the spherical surface with the axis 16 of the inner joint member 2 in the direction opposite to that of the plane 15 at the angle $\alpha$ equal to the angle $\alpha$ thereof. The center 18 of the circular locus 11 is at the intersection of a plane (the surface of the paper of FIG. 4) intersecting at a right angle with the plane 17 and containing the axis 17 intersecting the plane 17, and is spaced apart from the center 12 of the spherical surface by the distance equal to $S$ in the direction opposite to the center 15 of the circular locus 10.

Figure 4:
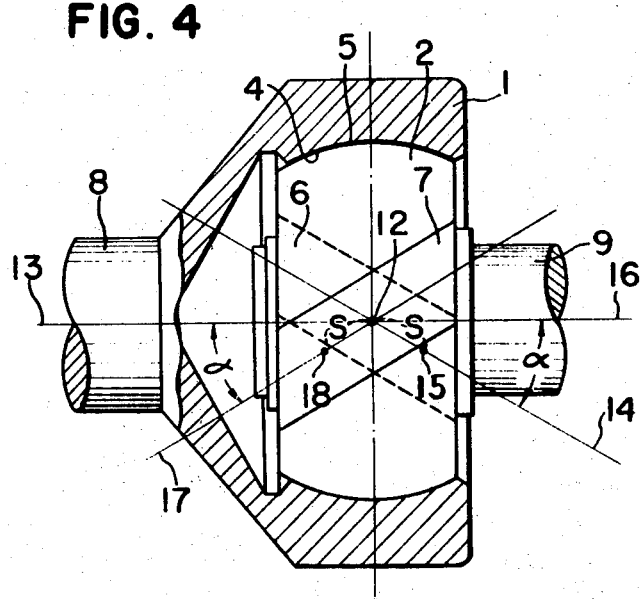
FIG. 4 is a view similar to FIG. 2 illustrating only one pair of grooves for the sake of simplicity of the description.
Figure 5:
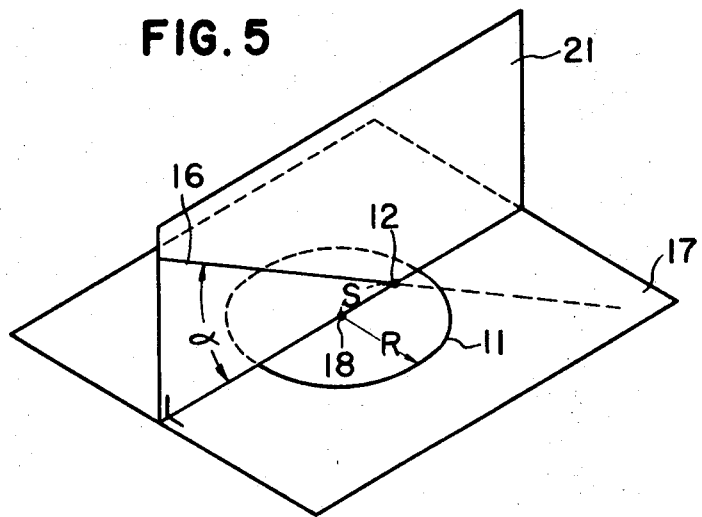
FIG. 5 is for explanation of a plane containing the locus of the center of the radius of the groove on the side of the inner joint member.

In FIG. 5, the plane 17 which is illustrated as the straight line in FIG. 4 is shown as a plane. The plane 17 intersects at the center 12 of the spherical surface with the axis 16 at an angle of $\alpha$. The plane 21 is perpendicular to the plane 17 and contains therein the axis 16. The center 18 of the circular locus 11 is spaced apart from the center 12 at the intersecting line between the planes 17 and 21 by the distance of $S$. The circular locus 11 having the radius of $R$ is traced upon the plane 17.

The groove 7 of the inner joint member 2 can be formed by positioning the center $o$ of the radius of the groove 7 along the circular locus 11 and milling the grooves 7 having the radius of $r$. The grooves 7 thus formed are illustrated by the one pair, two straight lines in FIG. 4.

Since the center 18 of the circular locus is spaced apart from the center 12 of the spherical surface by the distance of $S$, the center 18 of the circular locus of the inner joint member 2 in FIG. 4 is deviated toward the left from the center 12 of the spherical surface so that the groove 7 is formed inwardly of the circular locus 11. Therefore, the depth of the groove 7 is deeper on the right side of the axis of the inner joint member 2 than on the left side thereof. That is, FIG. 7 (a), (b) and (c) show that the depth of the groove is increased as the groove is formed from the left side of the axis toward the right side.

Figure 2:
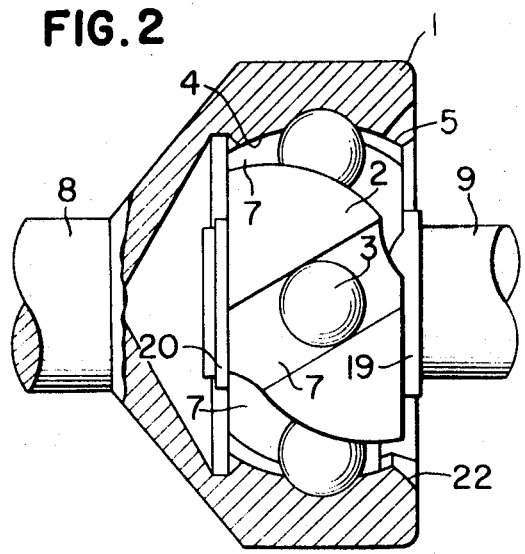
FIG. 2 is a partially sectional view taken along the line II–II of FIG. 1 with an outer joint member being shown in section.
Figure 3:
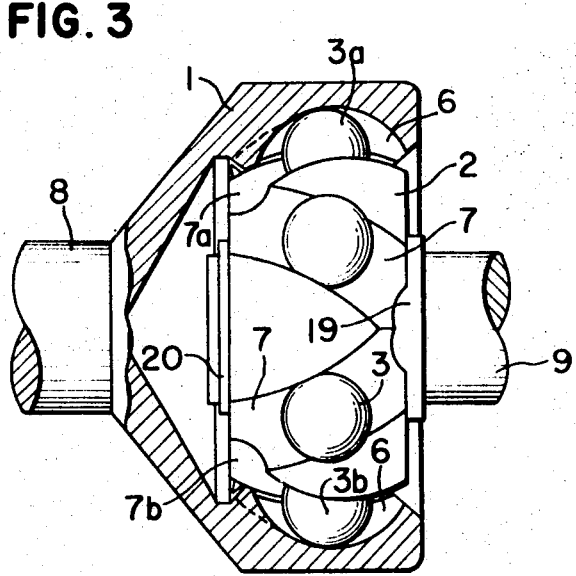
FIG. 3 is a view similar to FIG. 2 but taken along the line III–III of FIG. 1.
Figure 6:
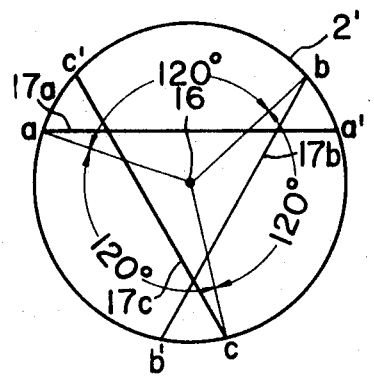
FIG. 6 is an explanatory view illustrating the arrangement of the grooves of the inner joint member.

FIG. 6 is for explanation of the arrangement of the grooves 7 of the inner joint member 2. The circle 2' is an imaginary circle showing the right end surface of the inner joint member 2. This circle will not become the true circle in practice because the grooves 7 are formed as shown in FIG. 1. One plane 17a of the planes 17 intersects with this circle 2' at the intersections $a$ and $a'$. That is, a pair of grooves 7 are formed on the sides of the points $a$ and $a'$ by the circular locus 11a upon the plane 17a. In the similar manner, two pairs of grooves are formed by the planes 17b and 17c, respectively, thus providing a total of three pairs of grooves, that is six grooves. When the points $a$, $b$ and $c$ are connected to the axis 16 in such a manner that the angles $a$-16-$b$, $b$-16-$c$ and $c$-16-$a$ become 120°, six grooves 7 are spaced apart from one another by a same distance in the plane containing the center 12 of the spherical surface and intersecting at a right angle with the axis 16. The grooves on the side of points $a$, $b$ and $c$ are symmetrically located (through 180°) with respect to the grooves on the side of the points $a'$, $b'$ and $c'$, these grooves are twisted with respect to each other in the opposite directions. This is shown in FIGS. 1, 2 and 3. When it is desired to provide five pairs of grooves, the angle of 120° may be reduced to 72° and five planes must be constructed.

The grooves 6 of the outer joint member 1 can be formed in the similar manner as described with reference to the grooves 7 of the inner joint member 2. As shown in FIG. 4, the circular locus 10 is deviated toward the right side due to the angle of inclination equal to $\alpha$ but in the direction opposite to that of the circular locus in case of the inner joint member 2, and the groove 6 is ordinarily formed in the direction opposite to that of the groove 7 so that the depth of the groove 6 is deeper on the right side of the axis of the member 1 as in the case of the groove 7 of the inner member 2.

The grooves 6 and 7 intersect with each other as shown in FIG. 4 and at this intersection is positioned a ball 3. In order to facilitate the assembly of the inner and outer joint members and to prevent the interference due to the balls, the outer joint member 1 may be beveled as shown in FIG. 2 by 22 or the boundary portions between the grooves and the spherical surfaces may beveled or chamfered smoothly for deburring the burrs produced during machining or preventing the sharp edges.

Next the mode of operation of a constant velocity universal joint of the present invention will be described hereinafter.

In case of a constant velocity joint, the transmission of power must be effected in the bisecting plane inclined at the same angles relative to the axes of the drive and driven shafts. As described hereinabove with reference to FIGS. 2, 3 and 4, when the axes of both shafts are coincident or aligned with each other, the ball 3 is positioned in the vertical plane containing the center 12 of the spherical surface and normal to the axes. When the ball 3a, the uppermost ball in FIG. 3, is caused to move toward the right, the ball 3a exerts the force to the surface of right sidewall of the groove 7a when viewed from the shaft 8, thereby causing the inner joint member 2 to rotate in the counterclockwise direction in FIG. 1 relative to the outer joint member 1 because the groove 7a is inclined relative to the axis in the same direction with that of the groove 7 shown in FIG. 1 and opposite to the direction of the groove 6. In this case, the groove 7b below the groove 7a is twisted in the direction opposite to that of the groove 7a, the ball 3b would be moved toward the left. But in practice, since the centers 15 and 18 of the circular loci are deviated from the center 12 of the spherical surface, the depths of the grooves 6 and 7 are increased as they advance toward the left of the axis, so that the ball 3b cannot move toward the left. Therefore, both of the upper and lower balls 3a and 3b lie in the bisecting plane inclined at the same angles relative to the axis 13 of the outer joint member 1 and the axis 16 of the inner joint member 2. In the similar manner, all the balls 3 are steadily held in the bisecting plane. It will be seen that no retainer is required in the constant velocity universal joint of the present invention, in order to hold the balls in the bisecting zone.

Figure 8:
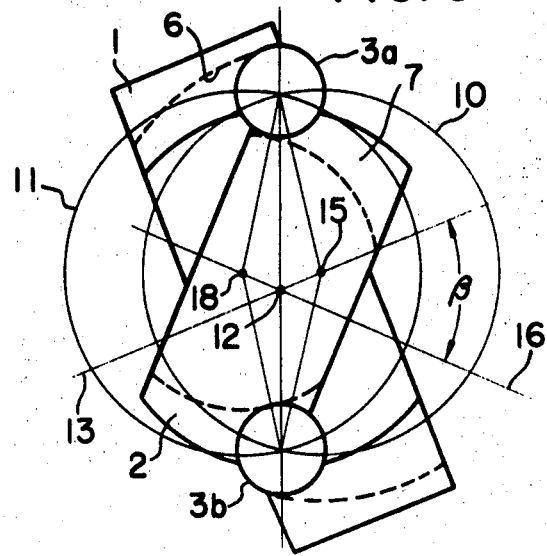
FIG. 8 is an explanatory view illustrating the positions of the balls when the axes of the shafts are inclined with each other.

As shown in FIG. 8, when the axis 13 of the outer joint member 1 intersects with the axis 16 of the inner joint member 2 at a working angle $\beta$, the balls are caused to move in the grooves 6 and 7 to the positions which are the intersections of the circular loci 10 and 11 of the centers of the radii of the grooves 6 and 7, that is the positions spaced apart equidistantly from the centers 15 and 18 of the circular loci. Since the centers 15 and 18 are equidistantly spaced apart from the center 12 of the spherical surface by the distance $S$, the balls are held in the bisecting plane which bisects the angle between the axes 13 and 16 of the shafts. Since the grooves 6 and 7 are twisted or inclined, the upper ball 3a is moved downwardly of the plane of the drawing paper while the ball 3b upwardly of the same plane, but both of the balls 3a and 3b remain in the equidistantly spaced-apart relation from the centers 15 and 18. Thus, it will be seen that the necessary conditions for attaining the constant velocity power transmission are satisfied in the universal joint of the present invention.

Figure 9:
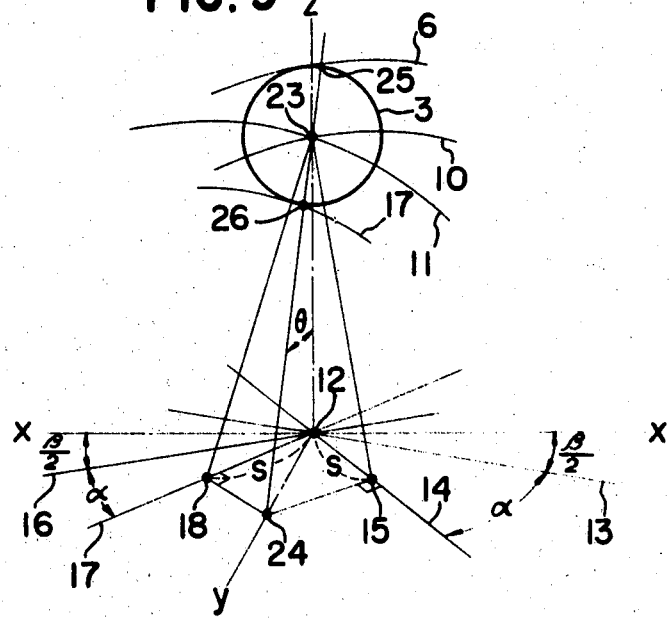
FIGS. 9 and 10 are explanatory views illustrating the power transmission respectively.

Next the mode of torque transmission will be described hereinafter. Sliding and rolling friction between the balls 3 and the grooves 6 and 7 are not taken into consideration because they are too small. Then, the power transmission is effected in the direction passing through the center of the ball and within a plane containing the center of the ball and being perpendicular to the side surface of the groove. In the universal joint of the present invention, as shown in FIG. 9, the circular locus 11 of the center of the radius of the groove 7 of the inner joint member 2 is a circle inclined at an angle $\alpha$ relative to the axis 16 having a center 18 spaced apart from the center 12 of the spherical surface by the distance $S$. Therefore, the power transmission between the ball and the inner joint member 2 is effected only in the plane passing through the center 23 of the ball 3 and the center 18 and being intersecting with the plane 17 at right angles. The power transmission between the outer joint member 1 and the ball 3 is effected only in the plane containing the center 23 of the ball 3 and the center 15 and intersecting with the plane 14 at right angles because the locus 10 of the center of the radius of the groove 6 is a circle whose center is a point shown by 15. The direction of the force acting between the ball 3 and the outer joint member 1 must be aligned with that of the force acting between the inner joint member 2 and the ball 3, the intersecting line 24-23 between the power transmission plane between the outer joint member 1 and the ball 3 and the power transmission plane between the inner joint member 2 and the ball 3 becomes the direction of the power transmission between the outer and inner joint members 1 and 2. The points of contact between the ball 3 and the grooves 6 and 7 are intersection of this line 23-24 with the grooves, that is the points 25 and 26. Since the angles of inclination of the axes of the inner and outer joint members are same, that is $\alpha$, and the centers of their loci of the centers of radii of the grooves of both members are spaced apart from the center 12 by the same distance $S$, these points 23, 24, 25 and 26 are always lying in the bisecting plane which bisects the angle between the axes 13 and 16. This line 23-24 inclines at $\theta$ relative to the line 23-12 connecting the center 23 of the ball and the center 12 of the spherical surface. As far as the angle one-half the working angle $\beta$ is within the range less than the angle $\alpha$ of inclination, the above angle of $\theta$ will not change its direction in whatever direction of the working angle $\beta$ may be. The above discussion is important for understanding of the torque transmission by the universal joint of the present invention.

Figure 10:
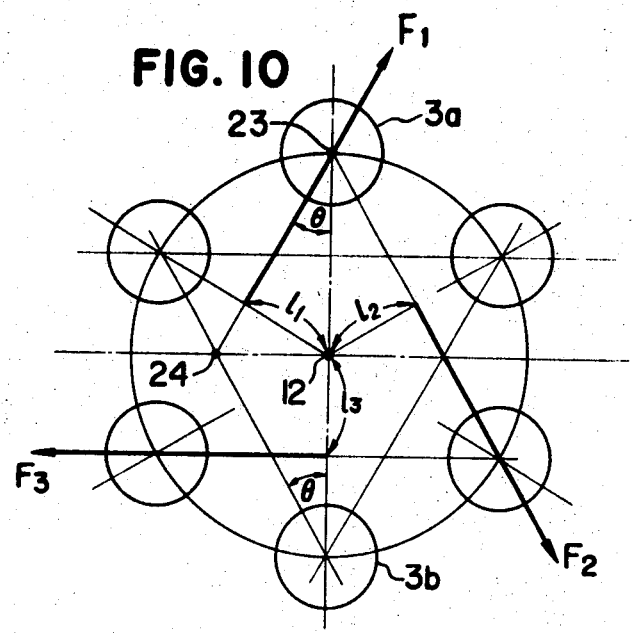

Referring to FIG. 10, the direction of the angle $\theta$ of the ball $3b$ located in opposite to the ball $3a$ is also opposite to the direction $\theta$ of the ball $3a$. Let it be assumed that the shaft 9 is a drive shaft and the torque is desired to be transmitted in the clockwise direction. Then, the upper ball $3a$ can transmit the torque while the lower ball $3b$ cannot. This is true for other balls in other grooves. That is only one-half of all the balls which are located in the grooves inclined in the same direction with that of the upper groove in FIG. 3 can transmit the power. On the other hand, in the power transmission in the opposite direction, the other half of the balls located in the grooves inclined in the direction opposite to that of the above groove, that is in the grooves each having the angle of inclination $\theta$ directed in the opposite direction can transmit the power.

The forces acting upon the ball $3a$ and other two balls are designated by $F_1$, $F_2$ and $F_3$ respectively; and the distances between the center 12 of the spherical surface and the lines 23-24 indicating the direction of the forces are designated by $l_1$, $l_2$ and $l_3$ respectively. Then the torque $T$ transmitted will become $$T = F_1 \cdot l_1 + F_2 \cdot l_2 + F_3 \cdot l_3$$

These forces $F_1$, $F_2$ and $F_3$ lie in the bisecting plane which bisect the angle between the axes 13 and 16. In this plane these forces are in equilibrium so that no force due to the torque transmission acts between the inner concave spherical surface 4 of the outer joint member and the outer convex spherical surface 5 of the inner joint member. Therefore, no heat and abrasion are generated between these two spherical surfaces. Furthermore, the direction of the angle $\theta$ is not reversed as far as the one-half of the working angle $\beta$ is within the angle $\alpha$ of inclination, so that when the angle $\alpha$ of inclination is present to a value sufficiently larger than the angle one-half the working angle $\beta$, there will be no abrupt decrease in torque transmission.

Figure 11:
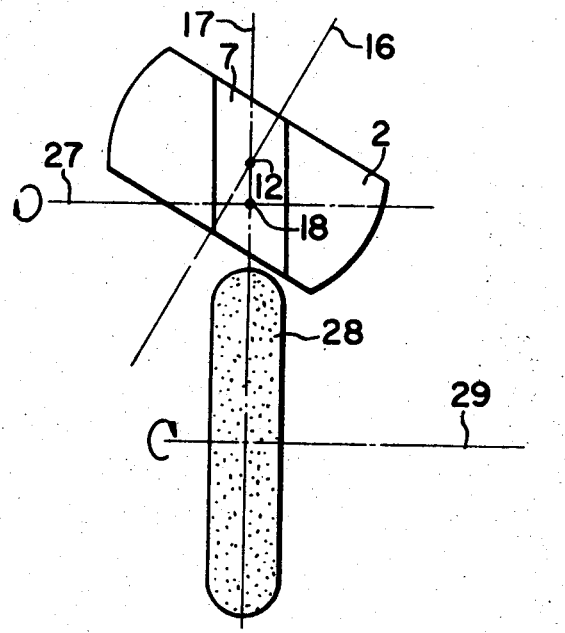
FIG. 11 is for explanation of grinding the grooves of the inner joint member.

Next a method for machining the universal joint of the present invention will be described hereinafter with reference to FIG. 11 illustrating the method for grinding the groove 7 of the inner joint member 2. The inner joint member 2 is rotated about the axis 27 intersecting at the center of the circular locus 11 with the plane 17 containing the circular locus 11 of the center of the radius of the groove 7 while a grinding wheel 28 rotating about an axis 29 in parallel with the axis 27 is contacted with the inner joint member, thereby grinding the groove. By shaping and truing the grinding wheel 28 so as to exactly conform with the configuration of the groove having the radius of $r$, one pair of grooves can be precisely formed. In the similar manner, two or four pairs of grooves can be formed all in equiangularly spaced-apart relation around the axis 16. In this similar manner, the grooves of the outer joint member can be formed, but in this case the grinding is internal opposed to the external grinding of the grooves of the inner joint member. The grinding method as described above is substantially similar to that for forming grooves of the outer and inner races of usual ball bearings, so that there is no special difficulty of machining the grooves of this universal joint.

The advantages accrued form the constant velocity universal joint according to the present invention will be described hereinafter:

A. The joint is comprising the outer and inner joint member 1 and 2 and the balls which are held in the grooves 6 and 7 which intersect with each other, so that the construction is simple without using the retainer and there will occur no malfunction due to the wear or abrasion of the retainer.

B. The directions of the axes can be determined only by fitting the outer convex spherical surface 5 into the inner concave spherical surface 4 so that axis direction holding devices are not required.

C. Since the balls lie in the bisecting plane which bisects the angle between the axes of the drive and driven shafts, the completely constant velocity or homokinetic power transmission can be effected.

D. Forces are always in equilibrium in the above bisecting plane so that no force acts upon the spherical surfaces of the outer and inner joint members 1 and 2. Therefore, there will be no generation of heat and no abrasion and wear in the intersurfaces between said two spherical surfaces and there will be no abrupt decrease in torque transmission efficiency even at a large working angle of $\beta$.

E. Since the power transmission can be effected by one-half of the balls, the torque transmission will not be abruptly reduced even if the working angle $\beta$ becomes larger.

F. Since the torque transmission will not be reduced abruptly as described in D and E as far as the angle one-half the working angle $\beta$ is less than the angle $\alpha$ of inclination, the working angle $\beta$ can be increased easily above 40° by increasing the angle $\alpha$ of inclination so that the constant velocity universal joint of the present invention can be advantageously applied when a large working angle $\beta$ is required.

G. No space is required for interposing a retainer between the outer and inner joint members 1 and 2, the constant velocity universal joint of the present invention is compact in size and light in weight.

H. Since the cross-sectional configuration of each of the grooves 6 and 7 is a simple arcuate curve, the machining of these grooves is much facilitated. That is, the shaping, truing and dressing of the grinding wheel are easy; both of the members 1 and 2 are only rotated during grinding; and a larger diameter grinding wheel may be advantageously used with increased efficiency.

I. A pair of grooves 7 formed in the spherical surface of the inner joint member 2 are symmetrical and located along the circumference of the spherical surface having the maximum radius thereof so that the assembly of the outer and inner joint members and balls is remarkedly facilitated.

In the embodiment, the center 15 of the circular locus has been shown as being positioned on the right side of the center 12 of the spherical surface as shown in FIG. 4 while the other center 18 of the other circular locus, as being positioned on the left side of the center 12, these centers 15 and 18 may be reversed in position in case of the outer joint member 1 which is not integrally formed with the shaft 8.

I claim:

1. A constant velocity universal joint comprising;
   an outer joint member having an inner concave spherical surface and a first shaft drivingly coupled thereto;

an inner joint member having an outer convex spherical surface adapted to be fitted into a space defined by said inner spherical surface of said outer joint member and having another shaft drivingly coupled thereto, both inner and outer joint members having substantially the same spherical radius and the same center;

a plurality of power-transmitting balls disposed in a pair of grooves, one groove of said pair of grooves being formed in the spherical surface of said outer joint member in predetermined opposed relation with the other groove which is formed in the spherical surface of said inner joint member, the number of grooves being an even number;

the cross-sectional configuration of said grooves being semicircularly shaped and having radius slightly larger than that of a ball;

each of the loci traced by the centers of the radii of said pairs of grooves being circles having a radius substantially equal to the radius of the interface between said outer and inner joint members;

one of said circular loci of the center of the radius of said one groove lying in a first plane which intersects at the center common in both of said spherical surfaces with the axis of said outer joint member at an angle;

the center of said one circular locus being positioned at the intersection of said plane with a plane intersecting at right angles with said plane and containing said axis and in spaced-apart relation with said center by a distance;

the other circular locus of the center of the radius of the other groove lying in a second plane which intersects with the axis of said inner joint member at the same angle with said angle of said first plane in the direction opposite to that thereof;

the center of said other circular locus being positioned at the intersection of the second plane with a plane intersecting at right angles with said second plane and containing said axis and in spaced-apart relation with the center by said distance in the direction opposite to said first center of said one circular locus;

said pair of grooves being formed along one of said circular loci in either of said outer or inner joint members, at least three pairs of such grooves being formed in said spherical surfaces of said outer and inner joint members in such a manner that said pairs of grooves are equidistantly spaced apart from one another in a plane containing said common center and intersecting at right angles to said axis, each of said balls being disposed at the intersection of said grooves crossing with each other.